T. G. JOHNS.
VARIABLE TRANSMISSION GEAR.
APPLICATION FILED JULY 10, 1915.
1,178,923.
Patented Apr. 11, 1916.
2 SHEETS—SHEET 1.
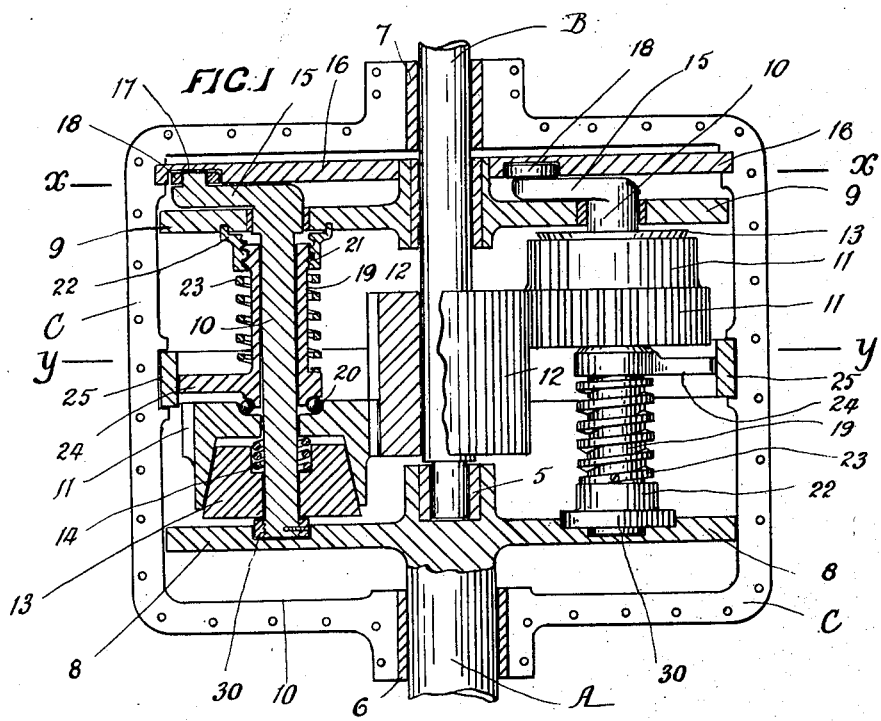
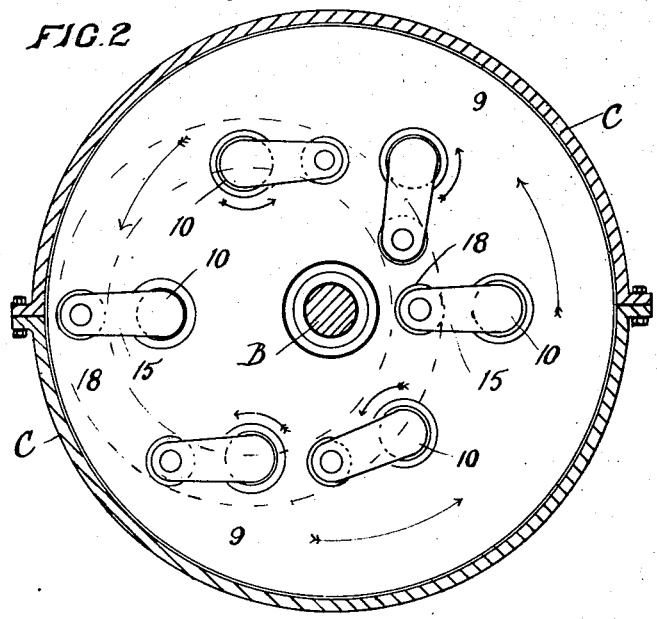
INVENTOR:
THOMAS GEORGE JOHNS
BY:
ATTORNEY

T. G. JOHNS.
VARIABLE TRANSMISSION GEAR.
APPLICATION FILED JULY 10, 1915.

1,178,923.

Patented Apr. 11, 1916.
2 SHEETS—SHEET 2.

INVENTOR:
THOMAS GEORGE JOHNS
BY: H. Van Oldenneel
ATTORNEY.

UNITED STATES PATENT OFFICE.

THOMAS GEORGE JOHNS, OF GISBORNE, NEW ZEALAND, ASSIGNOR TO JOHNS, BANNISTER AND COMPANY, LIMITED, OF GISBORNE, NEW ZEALAND.

VARIABLE TRANSMISSION-GEAR.

1,178,923.   Specification of Letters Patent.   Patented Apr. 11, 1916.

Application filed July 10, 1915. Serial No. 39,046.

*To all whom it may concern:*

Be it known that I, THOMAS GEORGE JOHNS, subject of the King of Great Britain, residing at Gisborne, New Zealand, have invented a new and useful Improved Variable Transmission - Gear; and I do hereby declare the following to be a full, clear, and exact description of the same.

This invention has been designed in order to provide an improved system and construction of gearing whereby motion may be transmitted at variable speeds and power from a prime mover of any known design, to any mechanism that is to be driven.

The invention has been particularly designed for use with the driving gear of motor cycles, motor cars and other like gears.

According to this invention the transmission gear is designed to transmit its motion through the agency of a number of driving pinions arranged in a ring around a central pinion and capable of being placed in and out of gear in relation to such central pinion. These driving pinions are mounted loosely upon spindles that are carried in disks, to which rotation is imparted by the prime mover so as thereby to carry the driving pinions around with them. During their travel they thus pass around the central pinion. This pinion is made fast upon the shaft to be driven and is adapted to be driven by being engaged by each of the driving pinions in turn as they are carried around by their disks and which pinions are given (by special means) a partial rotation on their own axes which at the time of engagement with the central pinion is in the same direction and at the same rate of speed. The rate of this partial rotation is variable so that the consequent rotation imparted to the central pinion also may be varied.

The gearing is illustrated in the accompanying drawings, in which:—

Figure 3:
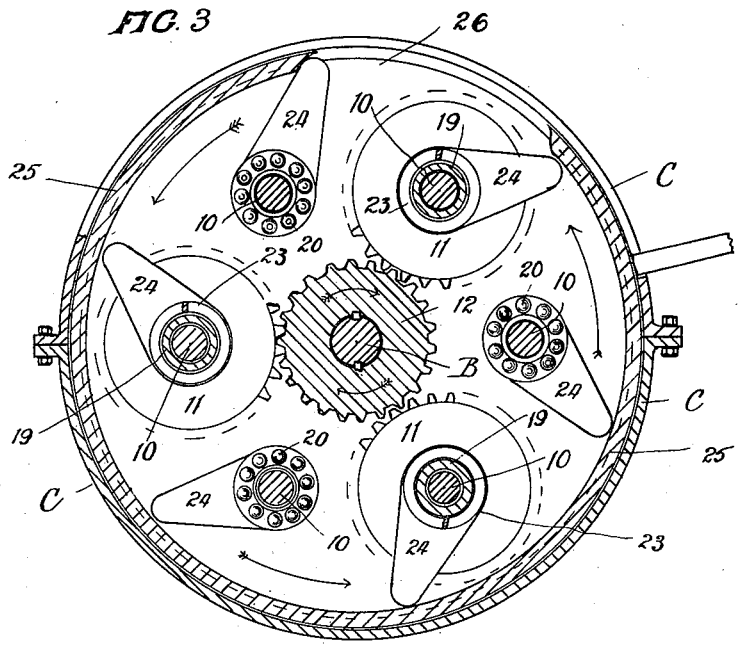
Figure 4:
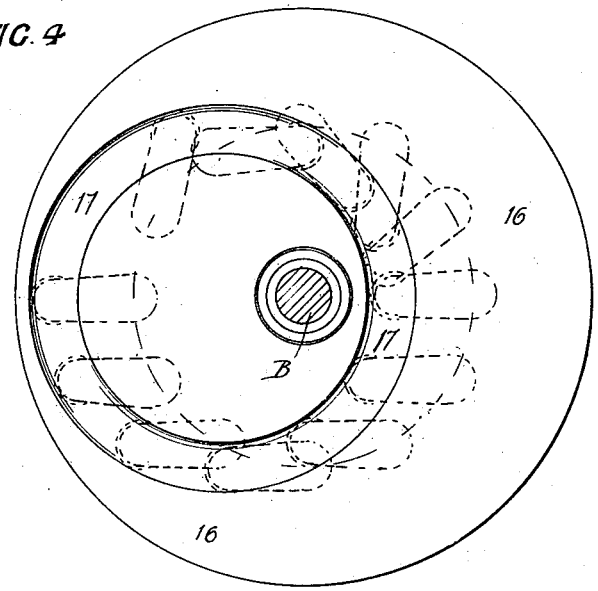

Figure 1 is a part sectional plan and part plan of the gearing and its casing. Fig. 2 is a sectional elevation on the line *x—x* of Fig. 1 and looking downward from such line. Fig. 3 is a sectional elevation on the line *y—y* of Fig. 1. Fig. 4 is an inside elevation of the eccentric grooved plate hereinafter more fully referred to.

A is the power or driving shaft receiving its rotation from the prime mover and B is the driven shaft to which the variable power is conveyed by the gearing. These two shafts are arranged end to end, the end of the shaft B being footstepped in a bearing (5) in the end of the shaft A, while both shafts are supported respectively in bearings 6 and 7 upon the ends of the casing C. This casing is of cylindrical form and made in two semi-cylindrical halves of suitable size bolted together by bolts passing through flanges in the well-known way.

A circular plate 8 is fixed upon or made integrally with the inner end of the power shaft A such plate being fitted to rotate within the casing near the adjacent end thereof. A similar plate 9 is fitted in the casing near its other end and this plate loosely fits on to the shaft B, being provided with a suitable bearing through which such shaft passes. These plates 8 and 9 support between them a number of countershafts 10 arranged at equal distances from their centers and at equal distances apart from one another. In the drawings six of such shafts are shown and each one is so mounted in the plates 8 and 9 that it will be free to rotate on its own axis. These several shafts and the plate 9 are carried around with the plate 8 as it rotates with the shaft A, the whole therefore moving in synchronism.

Upon each shaft is mounted a pinion 11 that gears with a central pinion 12 fixed upon the shaft B. In the drawings these pinions 11 are shown as occupying two relatively parallel planes, the several pinions being arranged alternately in the two planes. This is done for convenience in assembling the parts together, but any other approved arrangement may be employed, so long as the whole of the pinions 11 engage constantly with the central pinion 12 and are free to rotate therewith. The number of outer pinions also may be varied without departing from the principle of their arrangement and operation.

The gear is designed to transmit motion from the shaft A to the shaft B by the agency of the pinions 11 which are carried around the central pinion 12 with the shaft A and which by the means shown in the drawings are adapted to be given an independent rotation on their respective shafts at a predetermined point in their rotation around the central pinion, and thereby to transmit rotation to such pinion and the shaft B on which it is secured. This is effected by mounting each pinion loosely on its shaft 10 and in forming it with a female recess on its back face in which a clutch cone 13 is fitted. This cone is made fast upon the shaft 10 by means of the nut 30 and a spring 14 normally keeps the clutch open and the pinion 11 free. Each shaft 10 projects through the plate 9 and is formed with a crank arm 15 on such end which arm extends between such plate and a cam grooved plate 16 that is fixed within the casing. This latter plate is made with a circular groove 17 therein passing around the shaft B but arranged eccentrically with the axis of such shaft and that of the shaft A, as shown in Figs. 1 and 4. The several crank arms 15 are made of equal length and each one is furnished at its end with a cam roller 18 that fits into the groove 17 in the plate 16. The rotation of the shafts 10 around the central axis in the manner described will therefore cause the several cam rollers 18 to travel around within the groove 17, which by reason of its eccentric position, and by reason of its engagement with the cam rollers, will cause each crank arm 15 to be turned, and thereby to impart a rotation to each shaft on its own axis, in a manner that is already well known in the art and which is illustrated by the dotted diagrams in Fig. 4. These diagrams represent the positions assumed by each crank arm as it is carried around the groove 17. The rate of this independent rotation also varies with the position at which the crank arm is situated with regard to the groove 17 in a manner that is also well known in the art.

In the present invention the mechanism is designed to lock each pinion 11 with its shaft 10 at a point in its rotation around the central shaft, so that it will thus be given a power transmitting motion to the central pinion 12, while the others remain free on their shafts. Each pinion 11 in turn is thus locked to its shaft as the shaft reaches the predetermined point in its rotation so that a continuous motion is thus transmitted to the central pinion. The mechanism is also designed to vary with regard to the eccentric groove 17 the point in the rotation at which this locking action takes place, so that the rate at which the power or motion is imparted to the central pinion, may also be varied at will. This is effected by the provision of means whereby each pinion 11 may be engaged by its clutch at the point desired. These means consist in a sleeve 19 that loosely surrounds each shaft 10 and bears at one end against the pinion 11 thereon, suitable ball bearings 20 being interposed between their engaging faces in the manner shown. The other end of this sleeve is made with a quick male thread 21 which fits into a female threaded nut 22 that is fixed to the adjacent plate 8 or 9, as the case may be. Consequently a rotation of this sleeve in one direction will cause it to move longitudinally along the shaft 10 to force the pinion 11 on to its clutch and in tight engagement therewith, while a rotation of the sleeve in the opposite direction will cause it to move out and allow the pinion to free its clutch. This rotation of the sleeve is effected by means of a spring 23 loosely encircling it and at one end made fast to the nut 22 and at its other to a cam arm 24 fixed or formed on the sleeve end. This arm extends radially outward and is made of such a length as to engage at an incline with the inner surface of a cam ring 25 arranged on the inside of the casing in the manner shown in Fig. 3. The tension of the spring 23 is adjusted to turn the arm outward against this ring and to retain it in engagement therewith so that in the rotation of the apparatus, the several arms will slide around the inside of the ring. It is also so adjusted that when in this position the sleeve will be moved back along the shaft 10 to allow the pinion to free its clutch.

The ring 25 is made with a depression 26 (Fig. 3) therein so that when each cam arm reaches the depression the cam arm will turn out under the influence of its spring and thereby impart enough turning movement to the sleeve 19 to cause it to be moved along the shaft to lock the pinion thereon in the manner described. This depression is made of such a length as to allow of such locking engagement continuing until the next pinion in order reaches the point at which the locking action takes place, when the first mentioned arm leaves the depression and is forced back to its original position in order to free its pinion from its clutch. Each pinion in turn is thus locked and freed from its shaft.

The ring 25 is so mounted that it may be moved around within the casing and the position of the depression 26 altered in relation to the groove 17. Thus the point in rotation at which the pinions are in turn locked upon their shafts may be varied by adjusting the position of this ring. Any means for so adjusting it may be employed, such means varying with the circumstances in which the gearing is used and the purposes of its use. The position of the cam ring 25 may also be so adjusted that the locking of the pinions 11 on their respective shafts may take place at such point in the rotation of the cranks 15 in the groove 17 when the pinions 11 are caused to turn reversely and thus the gear may be used for transmitting a reverse motion while the power shaft continues to be driven in the forward direction.

I claim:—

1. In variable driving gear, the combination with a power shaft and a driven shaft of a series of counter-shafts arranged in parallel planes around the driven shaft and carried by the power shaft and each capable of independent rotation upon its own axis, a central pinion fixed upon the power shaft, a pinion loosely mounted upon each countershaft and engaging with the central pinion, a clutch fixed upon each countershaft adapted to be engaged by and locked with the pinion thereon, a sleeve surrounding each countershaft and engaging at one end with the pinion thereon and at the other formed with a male thread, a correspondingly threaded nut fixed from rotation but carried on the countershaft, into which the male threaded end of the sleeve is screwed, means for imparting turning movements in reverse directions to each sleeve at predetermined points in the travel of its countershaft around the driven shaft, and means whereby the countershafts may be rotated on their own axes as they travel around the driven shaft, substantially as specified.

2. In variable driving gear, in combination, a power shaft and a driven shaft arranged in a continuous plane, a series of countershafts arranged around the driven shaft in parallel planes therewith and carried by the power shaft and each capable of independent rotation on its own axis, means for imparting rotation to the countershafts as they are carried around with the power shaft and at varying speeds at different points in such travel, a central pinion fixed upon the driven shaft, a pinion loosely mounted on each countershaft, means upon each countershaft for locking the pinion thereon and for releasing it therefrom and means whereby such locking and releasing actions may be carried out at points in the travel of each countershaft around the driven shaft, variably positioned in relation to the rate of independent rotation imparted to the countershaft, substantially as herein specified.

3. In variable driving gear, in combination, a power shaft and a driven shaft, a circular plate carried by the power shaft, a number of countershafts mounted in such plate to extend in parallel lines with the driven shaft and made capable of independent rotation therein, means for imparting rotation to the countershafts at varying speeds at different points in their movement as they are carried around with the plate, a central pinion fixed upon the driven shaft, a pinion mounted loosely on each countershaft and engaging with the central pinion, clutch mechanism upon each countershaft adapted to lock the pinion thereto, a sleeve loosely mounted on each countershaft and engaging the side of the pinion thereon, adapted when moved longitudinally to force the pinion on to its clutch means for thus moving the sleeve in reverse directions by imparting a partial rotation thereto, a cam lever upon the sleeve and a cam ring encircling the whole of the cam levers, formed with a depression extending through a portion of its internal periphery and capable of adjustment around such levers, and a spring controlling each of such levers and forcing it out against the ring, substantially as specified.

4. In variable driving gear, in combination, a power shaft and a driven shaft, a central pinion fixed upon the driven shaft, a series of countershafts carried by the power shaft and extending in parallel lines around the driven shaft and each capable of rotation upon its own axis, a crank arm on each countershaft and a cam roller mounted on the end of each crank arm, a plate fixed adjacent to the crank arms and formed with a groove therein extending around the driven shaft but eccentrically therewith, a pinion mounted loosely on each countershaft and engaging the central pinion, clutch mechanism upon each countershaft for locking the pinion thereto, a cam lever controlling the operation of each clutch, and a cam ring encircling the whole of the cam levers and formed with a depression extending through a portion of its internal periphery, a spring forcing each cam lever out against the inner surface of the cam ring, and adapted to be rotated to position its depression at varying points in relation to the position of the eccentric groove in the fixed plate, substantially as specified.

In testimony whereof, I have signed this specification in the presence of two subscribing witnesses.

THOMAS GEORGE JOHNS.

Witnesses:
JAMES ROBERT HIRD,
R. R. BALDREY.